United States Patent [19]

Takuma

[11] Patent Number: 5,343,119
[45] Date of Patent: Aug. 30, 1994

[54] INDEX TYPE CRT HAVING A PHOTOSENSOR WITH A FUNCTION OF AMPLIFIER

[75] Inventor: Hirokazu Takuma, Kanagawa, Japan
[73] Assignee: Sony Corporation, Shinagawa, Japan
[21] Appl. No.: 2,543
[22] Filed: Jan. 11, 1993
[30] Foreign Application Priority Data
  Jan. 10, 1992 [JP] Japan .................. 4-003297
[51] Int. Cl.⁵ .............................................. H01J 31/26
[52] U.S. Cl. ......................................... 315/10; 348/813
[58] Field of Search ....................... 315/10, 383; 358/69
[56] References Cited
U.S. PATENT DOCUMENTS
  3,163,713  12/1964  Rudd .

Primary Examiner—Theodore M. Blum
Attorney, Agent, or Firm—Lewis H. Eslinger; Jay H. Maioli

[57] ABSTRACT

A display device includes a beam index type cathode ray tube having a fluorescent screen on which red, green and blue fluorescent materials are formed in strip configurations and further index fluorescent materials are formed in strip configurations with a predetermined pitch, a sensor for converting light generated from the index fluorescent materials into an electric signal when an electron beam is impinged on the index fluorescent materials upon horizontal scanning of the electron beam with respect to the fluorescent screen, and for multiplying the converted electric signal, an index signal processing circuit for switching red, green and blue signals in accordance with the multiplied electric signal from the sensor, and for controlling luminance of the cathode ray tube in accordance with a luminance level control signal, and a driving voltage generating circuit for controlling a driving voltage applied to the sensor in accordance with the luminance level control signal to thereby control a multiplication ratio of the sensor.

5 Claims, 4 Drawing Sheets

INDEX TYPE CRT HAVING A PHOTOSENSOR WITH A FUNCTION OF AMPLIFIER

BACKGROUND OF THE INVENTION

1. Field of the Invention

The present invention generally relates to display devices and, more particularly, is directed to a display device having a beam index type (beam-indexing) cathode ray tube (CRT).

2. Description of the Prior Art

In general, the beam index type CRT has a fluorescent screen which is constituted by forming red, green and blue fluorescent materials in strip configurations and then by forming at a constant pitch material which generates secondary electrons or ultraviolet rays, that is, index fluorescent materials in strip configurations. The beam index type CRT selects a color to be illuminated in a manner that a position of an electron beam is detected by detecting secondary electrons or ultraviolet rays which are instantly generated from the fluorescent screen upon horizontal scanning of an electron beam and then the electron beam is controlled in accordance with the detected position.

The beam index type CRT has the following features since it does not need a color selection electrode such as a shadow mask for seizing a beam current:

(1) an electron beam is utilized at a high efficiency, and so luminance of the CRT is high and electric power consumption thereof is low;

(2) the electron beam is a single beam, and so there is no problem of beam concentration;

(3) the CRT is hardly influenced by earth magnetism; and (4) the construction of the tube is simple.

Recently, the beam index type CRT has been employed as a display device for a cockpit of an airplane, for example, due to the high luminance thereof. Namely, it is an absolute condition for the display device for the cockpit that image information can be surely recognized by a pilot in various conditions such as the day time where sunlight is directly incident on the display and the nighttime where there is no outdoor daylight. To this end, the display device is required to have a high luminance and a high contrast, so that the beam index type CRT has been employed as a display device for the cockpit due to the high luminance thereof.

However, the beam index type CRT has the disadvantage such that the screen is always illuminated since an electron beam is required to be always irradiated on the screen. The lowest luminance level of the screen due to this electron beam is called a black level or a black luminance level, in general. This black level does not cause any problem in the daytime about recognizing an image information on the screen, but causes an important problem in the nighttime. Namely, luminance of the background image of the screen due to the black level becomes brighter in the nighttime, so that it becomes difficult to recognize an image information.

In order to decrease the luminance of the black level, it is required to decrease an amount of the electron beam. However, if an amount of the electron beam is simply decreased, an amount of secondary electrons or ultraviolet rays generated from the fluorescent screen upon impingement of the electron beam thereon also decreases, so that the detection of the secondary electrons or ultraviolet rays becomes difficult.

In order to obviate this problem, the conventional display device employs, as an element for detecting the secondary electrons or ultraviolet rays, an element having a function of multiplying the detected beams or rays, for example, a photomultiplier. The photomultiplier is a photo sensor with a high sensitivity, a low noise and a high-speed responsibility having a function of multiplying secondary electrons.

FIG. 1 of the accompanying drawings shows an example of conventional display devices utilizing the photomultipliers. Referring to FIG. 1, this display device comprises a photomultiplier 12 which detects, through an optical filter 11, light which is generated from the beam index type CRT (hereinafter referred to as a CRT) upon impingement of the electron beam on the fluorescent screen thereof and then generates an electric signal (index signal) Si depending on an amount of the detected light.

The index signal Si from the photomultiplier 12 is amplified by an amplifier 13 and then supplied to an index signal processing circuit 14. The index signal processing circuit 14 changes over inputted red (R), green (G) and blue (B) signals in accordance with the index signal Si from the photomultiplier 12 through the amplifier 13 to thereby output the R, G and B signals alternately in time sequence to the CRT.

A luminance level of the CRT is determined by adjusting a luminance level control volume 15. That is, the index signal processing circuit 14 controls a gain of each of the R, G and B signals in accordance with a luminance level control signal Sv from the volume 15.

The photomultiplier 12 is supplied with a power supply voltage Vd so as to maintain a constant multiplication ratio thereof from a power supply circuit 16 to which an external constant voltage V is supplied.

However, the thus constituted conventional display device has the following disadvantages.

When the multiplication ratio of the photomultiplier 12 is set to be low, since a signal level of the index signal Si becomes lower, it may become difficult to detect the position of the electron beam, so that it is required to set an initial luminance level of the CRT higher. As a result, the black level becomes higher and so image quality is degraded, thereby recognition of image information becomes difficult.

Conversely, when the multiplication ratio of the photomultiplier 12 is set to be higher, a level of the index signal Si saturates in a high luminance mode, so that it becomes impossible to detect the position of the electron beam, thereby a normal image can not be reproduced on the screen.

The fluorescent screen of the CRT has an ineffective screen area and an effective screen area. In the effective screen area, red, green and blue fluorescent materials are formed separately and carbon materials are formed therebetween, and further index fluorescent materials are formed on the carbon materials with a predetermined distance. In the ineffective screen area, carbon is formed on the entire surface of this area and index fluorescent materials are formed on the carbon with a predetermined distance.

The scanning by an electron beam is started from an end portion of the ineffective screen area. In this case, when light generated from the first index fluorescent material on the ineffective screen area is not detected, the change over timing of the R, G and B signals shifts from the correct timing. As a result, for example, the red fluorescent material is not excited by the R signal but excited by the G or B signal, so that a normal image can not be reproduced on the screen.

When the ineffective screen area is scanned by an electron beam, only a detection signal (white level signal) from the index signal processing circuit 14 is supplied to the CRT, whereby the index fluorescent materials on the ineffective screen area are excited by the detection signal. In contrast, when the effective screen area is scanned by an electron beam, one of the R, G and B signals selectively changed over by the index processing circuit 14 and the detection signal are added and then supplied to the CRT.

In the thus constituted conventional display device, since a level of the detection signal is kept to a constant value, a signal level of the index signal Si obtained from the photomultiplier 12 with the fixed amplification ratio by scanning the first index fluorescent material changes largely, whereby it is difficult to surely detect the index signal corresponding to the first index fluorescent material, thereby a normal image can not be reproduced.

OBJECTS AND SUMMARY OF THE INVENTION

Therefore, it is an object of the present invention to provide an improved display device in which the aforementioned shortcomings and disadvantages encountered with the prior art can be eliminated.

More specifically, it is an object of the present invention to provide a display device which can decrease the black level in the low luminance mode of the CRT and prevent the saturation of the level of the index signal in the high luminance mode to thereby display a normal image on the screen.

It is another object of the present invention to provide a display device which can surely detect the index signal corresponding to the first index fluorescent material and display a normal image on the screen.

According to one aspect of the present invention, a display device is comprised of a beam index type cathode ray tube having a fluorescent screen on which red, green and blue fluorescent materials are formed in strip configurations and further index fluorescent materials are formed in strip configurations with a predetermined pitch, a sensor for converting light generated from the index fluorescent materials into an electric signal when an electron beam horizontally scans the fluorescent screen and the electron beam impinges on the index fluorescent materials, and for multiplying the converted electric signal, an index signal processing circuit for switching red, green and blue signals in accordance with the multiplied electric signal from the sensor, and for controlling luminance of the cathode ray tube in accordance with a luminance level control signal, and a driving voltage generating circuit for controlling a driving voltage applied to the sensor in accordance with the luminance level control signal to thereby control a multiplication ratio of the sensor.

According to another aspect of the present invention, a display device is comprised of a beam index type cathode ray tube having a fluorescent screen with an effective screen area on which red, green and blue fluorescent materials are formed in strip configurations and further with an ineffective screen area and the effective screen area on which index fluorescent materials are formed in strip configurations with a predetermined pitch; a sensor for converting light generated from the index fluorescent materials into an electric signal when an electron beam horizontally scans the fluorescent screen and the electron beam impinges on the index fluorescent materials, and for multiplying the converted electric signal, an index signal processing circuit for switching red, green and blue signals in time sequence to the cathode ray tube in accordance with the multiplied electric signal from the sensor, for adding to the red, green or blue signal a detection signal for detecting the index fluorescent materials in the ineffective screen area of the cathode ray tube, and for controlling luminance of the cathode ray tube in accordance with a luminance level control signal; a driving voltage generating circuit for controlling a driving voltage applied to the sensor in accordance with the luminance level control signal to thereby control a multiplication ratio of the sensor; and a variable circuit for changing the detection signal in accordance with the luminance level control signal.

Preferably, the variable circuit changes the detection signal, for example, to a high level when the luminance level control signal is changed to a high level, and changes the detection signal to a low level when the luminance signal level control signal is changed to a low level.

Preferably, the driving voltage generating circuit controls the driving voltage, for example, so as to decrease the multiplication ratio of the sensor when the luminance level control signal is changed to a high level, and controls the driving voltage so as to increase the multiplication ratio of the sensor when the luminance level control signal is changed to a low level.

According to the display device of one aspect of the present invention, the driving voltage control circuit is provided so as to change a multiplication ratio of the sensor in accordance with the luminance level control signal. For example, the driving voltage generating circuit is provided in order to control the driving voltage so as to decrease the multiplication ratio of the sensor when the luminance level control signal is changed to a high level, and control the driving voltage so as to increase the multiplication ratio of the sensor when the luminance level control signal is changed to a low level. Thus, a multiplication ratio of the sensor is increased when the luminance level control signal becomes a low level to thereby decrease the luminance of the CRT, so that a position of an electron beam can be surely detected even if an amount of light generated from the index fluorescent materials is a small value. Thus, since an energy amount of an electron beam can be decreased at a low luminance mode, the black level can also be decreased accordingly.

In contrast, when the luminance level control signal becomes a high level to thereby increase the luminance of the CRT, the multiplication ratio of the sensor is reduced by the driving voltage generating circuit, so that the multiplied electric signal does not saturate even if a large amount of light is incident on the sensor from the index fluorescent material, thereby a position of an electron beam can be surely detected. Accordingly, a normal image can be displayed even in a high luminance mode, thereby image quality can be improved.

According to the display device of the other aspect of the present invention, in addition to the driving voltage generating circuit of the first aspect of the present invention, the variable circuit is provided so as to change in accordance with the luminance level control signal a level of the detection signal which is used to excite and detect the index fluorescent materials in the ineffective screen area. For example, the variable circuit is provided in order to change the detection signal, for example, to a high level when the luminance level control signal is changed to a high level, and change the detection signal to a low level when the luminance signal level control signal is changed to a low level. Thus, a black level in a low luminance mode can be decreased and further a normal image can be displayed in a high luminance mode, thereby image quality can be improved as well as the display device according to the first aspect of the present invention.

Further, when the luminance level control signal becomes a high level to thereby increase the luminance of the CRT, the multiplication ratio of the sensor decreases in accordance with the driving voltage from the driving voltage generating circuit. However, since a signal level of the detection signal becomes higher by the variable circuit, an amount of light generated from the index fluorescent materials of the ineffective screen area increases, so that light generated from the index fluorescent material, in particular, the first index fluorescent material on the ineffective screen area can be surely detected.

In contrast, when the luminance level control signal becomes a low level to thereby decrease the luminance of the CRT, a multiplication ratio of the sensor increases in accordance with the driving voltage from the driving voltage generating circuit, so that an amount of light generated from the index fluorescent materials of the ineffective screen area is increased by the sensor, thereby a signal level of the multiplied electric signal may be saturated. However, since a signal level of the detection signal becomes lower by means of the variable circuit, an amount of light generated from the index fluorescent materials of the ineffective screen area decreases, so that the saturation of the multiplied electric signal is prevented and so light generated from the index fluorescent material, in particular, the first index fluorescent material on the ineffective screen area can be surely detected.

As described above, in accordance with the display device of the other aspect of the present invention, since the light generated from the first index fluorescent material can be surely detected, there occurs no phenomenon that the change-over timing of chrominance or color signals (the R, G, and B signals) is shifted from the correct timing, so that a normal image can be displayed and image quality can be improved.

The preceding and other objects, features, and advantages of the present invention will become apparent from the following detailed description of illustrative embodiments thereof when read in conjunction with the accompanying drawings, in which like reference numerals are used to identify the same or similar parts in the several views.

DETAILED DESCRIPTION OF THE PREFERRED EMBODIMENTS

Embodiments of the display device according to the present invention will now be described with reference to FIGS. 2 to 4.

Figure 1:
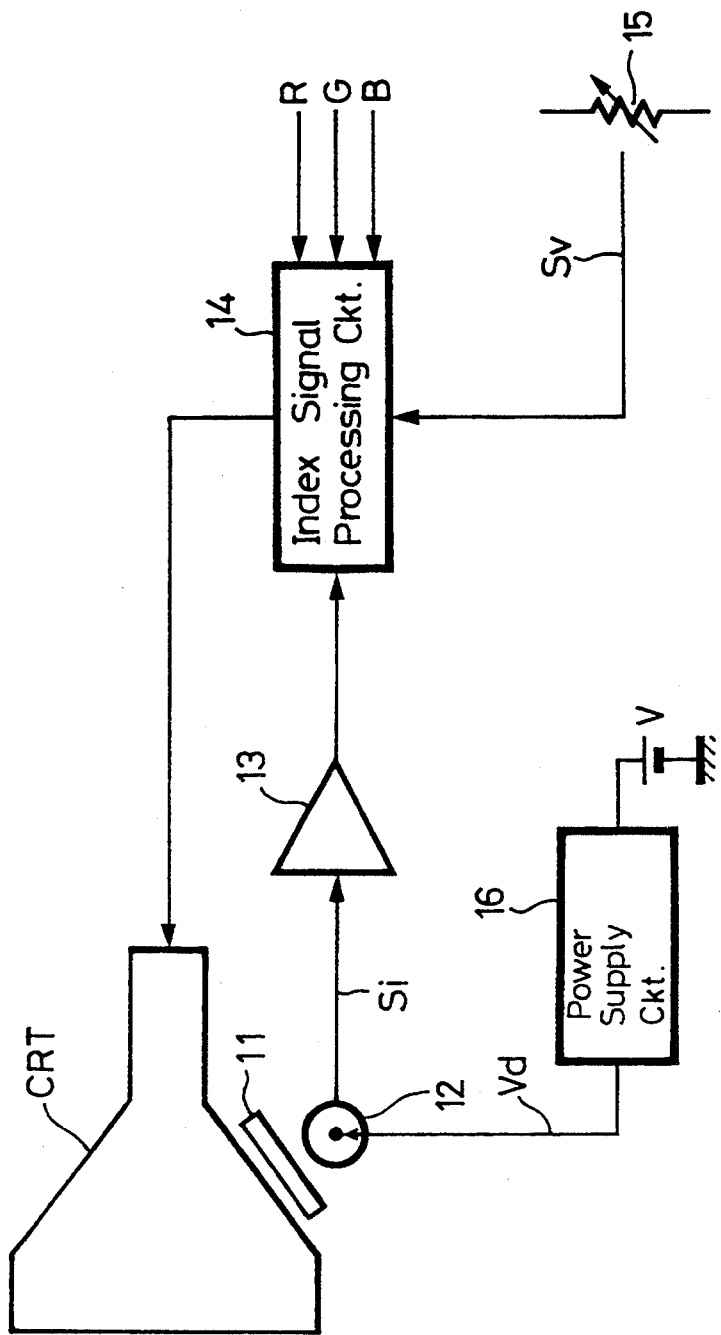
FIG. 1 is a schematic block diagram illustrating an example of conventional display devices utilizing photomultipliers.
Figure 2:
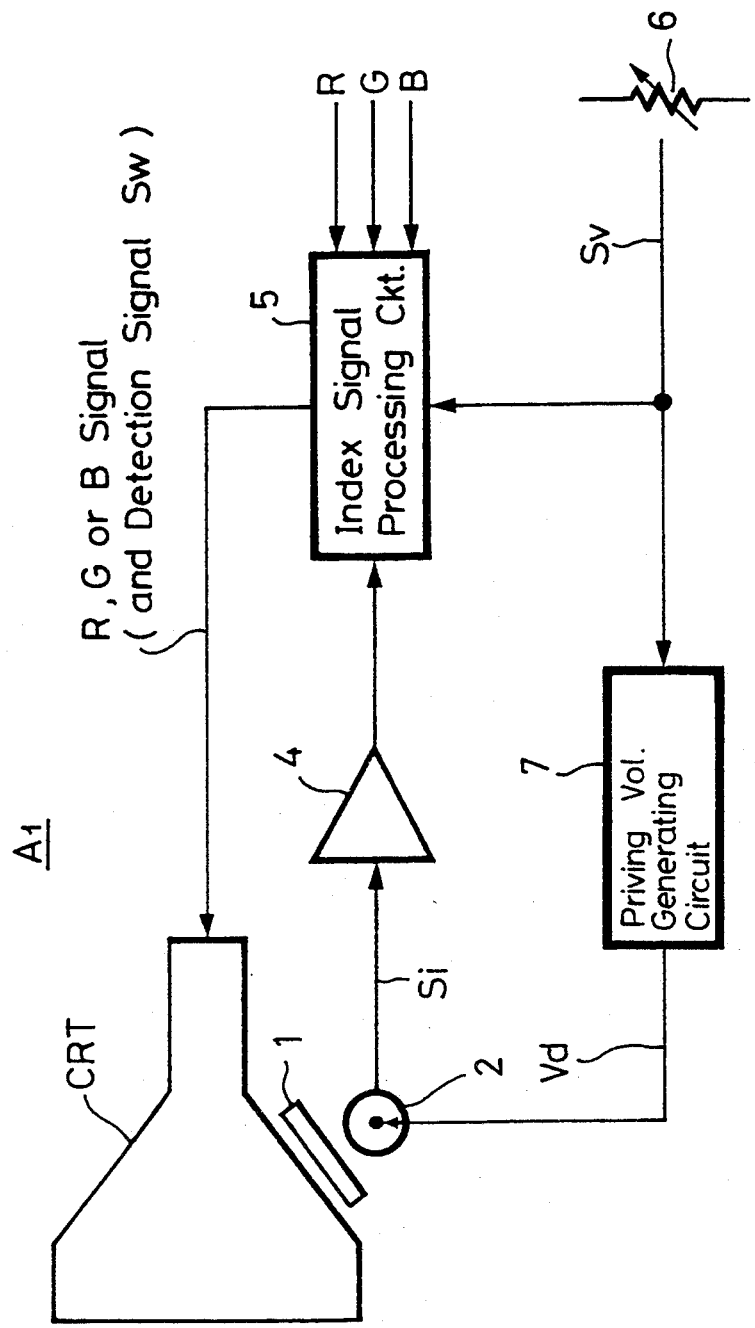
FIG. 2 is a schematic block diagram illustrating an arrangement of a display device according to a first embodiment of the present invention.

FIG. 2 shows in block form an arrangement of the display device A1 according to the first embodiment of the present invention. Referring to FIG. 2, the display device A1 includes a beam index type cathode ray tube, CRT (hereinafter referred to as a CRT) and a photomultiplier 2. The photomultiplier 2 detects, through an optical filter 1, light which is generated from the CRT upon impingement of an electron beam on a fluorescent screen thereof and then converts the detected light into an electric signal (index signal) Si which corresponds to an amount of the detected light.

Figure 3:
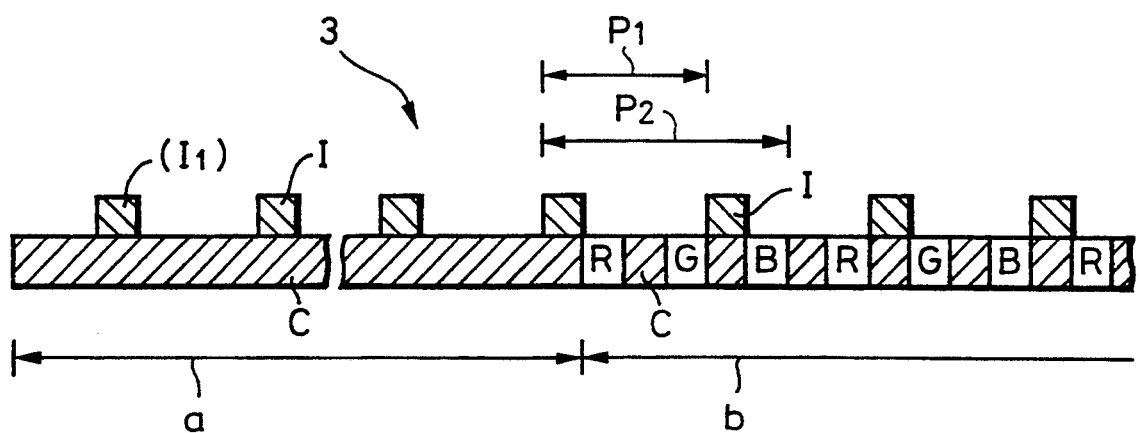
FIG. 3 is a schematic sectional view illustrating a part of a fluorescent screen of a beam index type CRT of the first embodiment.

A fluorescent screen 3 of the CRT has an ineffective screen area a and an effective screen area b as shown in FIG. 3. Referring to FIG. 3, on the effective screen area b, red, green and blue fluorescent materials (R, G, B) in strip configurations are formed separately and carbon materials C in strip configurations are formed therebetween, and further index fluorescent materials I of strip configurations are formed on the carbon materials C with a predetermined distance therebetween. On the ineffective screen area a, carbon material C is formed on the entire surface of this area a and index fluorescent materials I of strip configurations are formed on the carbon material C with a predetermined distance therebetween.

In particular, in the effective screen area b, a ratio between an arranging pitch of the index fluorescent materials I and an arranging pitch of triads or sets of the red, green and blue fluorescent materials (R, G, B) is not an integer. That is, supposing that each of widths of the red, green and blue fluorescent materials (R, G, B), a width of the index fluorescent material I and a width of the carbon material C is the same value P so as to simplify the explanation, an arranging pitch P1 of the index fluorescent materials I will be 4 P and an arranging pitch P2 of the triads of the R, G and B will be 6 P. Thus, a ratio P1/P2 between the arranging pitch P1 of the index fluorescent materials I and the arranging pitch P2 of the triads will be ⅔ which is not an integer.

This embodiment uses a side-on type photomultiplier as the photomultiplier 2 which is located at a funnel window of the CRT at the opposite side of the ineffective screen area a. Since spectral sensitivity characteristics of a photoelectric surface of the photomultiplier 2 have a broad range, the optical filter 1 is arranged to extract only visible light from the index fluorescent materials I and introduce the extracted light to the photomultiplier 2 so as not to saturate the photomultiplier 2 by light from the fluorescent material incident through an aluminum film.

As shown in FIG. 2, the index signal Si from the photomultiplier 2 is amplified by an amplifier 4 and then supplied to an index signal processing circuit 5 at the next stage. The index signal processing circuit 5 changes over red (R), green (G) and blue (B) signals fed thereto in accordance with the index signal Si from the photomultiplier 2 through the amplifier 4 to thereby output the R, G and B signals alternately in time sequence to the CRT.

The scanning of an electron beam is started from an end portion of the ineffective screen area a. When the ineffective screen area a is scanned by the electron beam, only a detection signal (white level signal) Sw from the index signal processing circuit 5 is supplied to the CRT, whereby the index fluorescent materials I on the ineffective screen area a are excited by the detection signal Sw. In contrast, when the effective screen area b is scanned by the electron beam, one of the R, G and B signals selectively changed over by the index processing circuit 5 is added to the detection signal Sw and then supplied to the CRT.

A luminance level of the CRT is determined by adjusting a luminance level control 6. That is, the index signal processing circuit 5 controls a gain of each of the R, G and B signals in accordance with a luminance level control signal Sv from the control 6.

In this embodiment, a driving voltage generating circuit 7 is provided so as to control a driving voltage Vd applied to the photomultiplier 2 in accordance with the luminance level control signal Sv to thereby change a multiplication ratio of the photomultiplier 2. In this example, the driving voltage generating circuit 7 controls the driving voltage Vd so as to decrease the multiplication ratio of the photomultiplier 2 when the luminance level control signal Sv changes, for example, to a high luminance level while to increase the multiplication ratio when the signal Sv changes to a low luminance level.

That is, when the luminance level of the CRT is increased by operating the control 6, a signal level of the index signal Si outputted from the photomultiplier 2 may saturate disadvantageously. Thus, in order to prevent the saturation of the index signal Si even at a high luminance mode, the multiplication ratio of the photomultiplier 2 is decreased at that time. Since the multiplication ratio is determined by the driving voltage Vd supplied to the photomultiplier 2, the driving voltage Vd is set to A volts as shown in FIG. 4 by the driving voltage generating circuit 7 so as to decrease the multiplication ratio.

In contrast, if the driving voltage Vd supplied to the photomultiplier 2 is kept at the A volt level when the luminance level of the CRT is decreased by operating the control 6, the multiplication ratio of the photomultiplier 2 is low. Thus, in this case, if the black level is high, contrast of an image is degraded and a level of the index signal Si becomes lower than a predetermined value, so that an index error occurs and a normal image can not be displayed.

Figure 4:
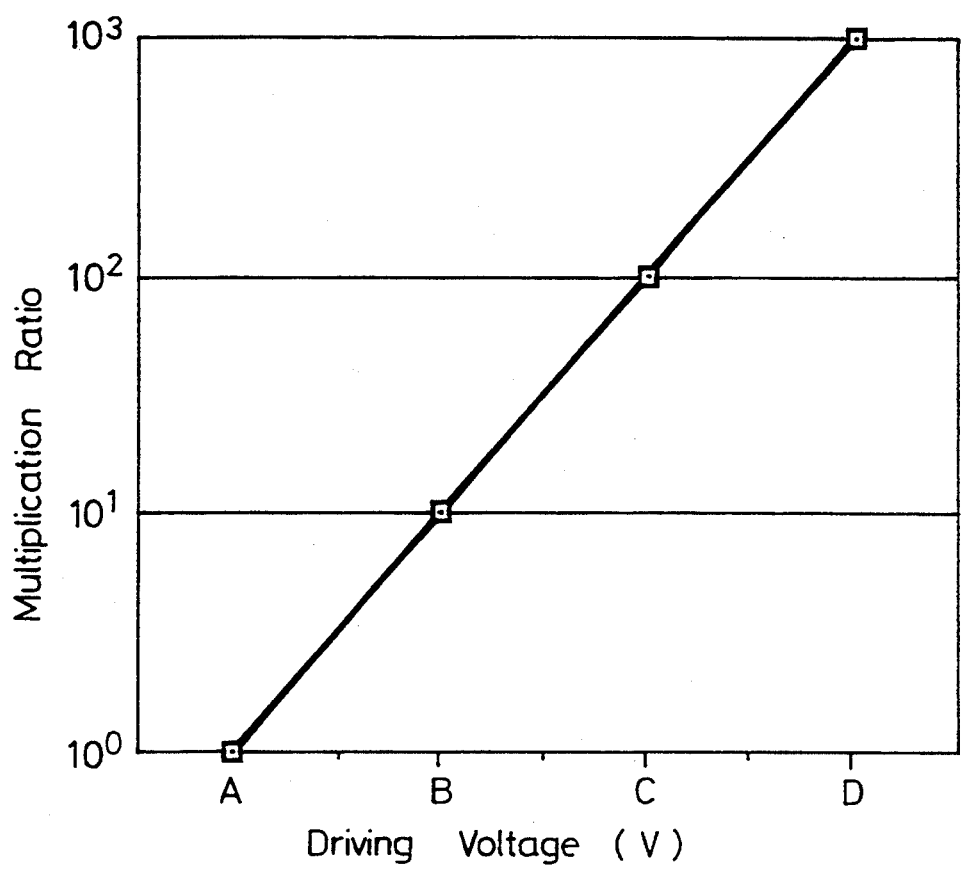
FIG. 4 is a characteristic diagram illustrating a relation between multiplication ratios of a photomultiplier and a driving voltage applied thereto.

In order to obviate this problem, the driving voltage Vd is increased by the driving voltage generating circuit 7 to a D volt level from the A volt level as shown in FIG. 4 so as to increase the multiplication ratio of the photomultiplier 2. Namely, at the same time when the luminance level of the CRT is controlled by the volume 6, the driving voltage Vd of the driving voltage generating circuit 7 is controlled by the luminance level control signal Sv from the control 6 to thereby control the multiplication ratio of the photomultiplier 2.

According to the thus constituted display device of the first embodiment, since the driving voltage generating circuit 7 is provided so as to control the driving voltage Vd applied to the photomultiplier 2 in accordance with the luminance level control signal Sv to thereby change the multiplication ratio of the photomultiplier, the multiplication ratio of the photomultiplier 2 is increased when the luminance level control signal Sv becomes a low level to thereby decrease the luminance of the CRT, so that the position of an electron beam can be surely detected even if an amount of light generated from the index fluorescent materials I is a small value. Thus, since an amount of an electron beam can be decreased at a low luminance mode, the black level can also be decreased accordingly.

In contrast, when the luminance level control signal Sv becomes a high level to thereby increase the luminance of the CRT, the multiplication ratio of the photomultiplier 2 decreases, so that the index signal Si does not saturate even if a large amount of light is incident on the photomultiplier 2 from the index fluorescent materials I, thereby the position of an electron beam can be surely detected. Accordingly, a normal image can be displayed even in a high luminance mode, thereby the image quality can be improved.

Figure 5:
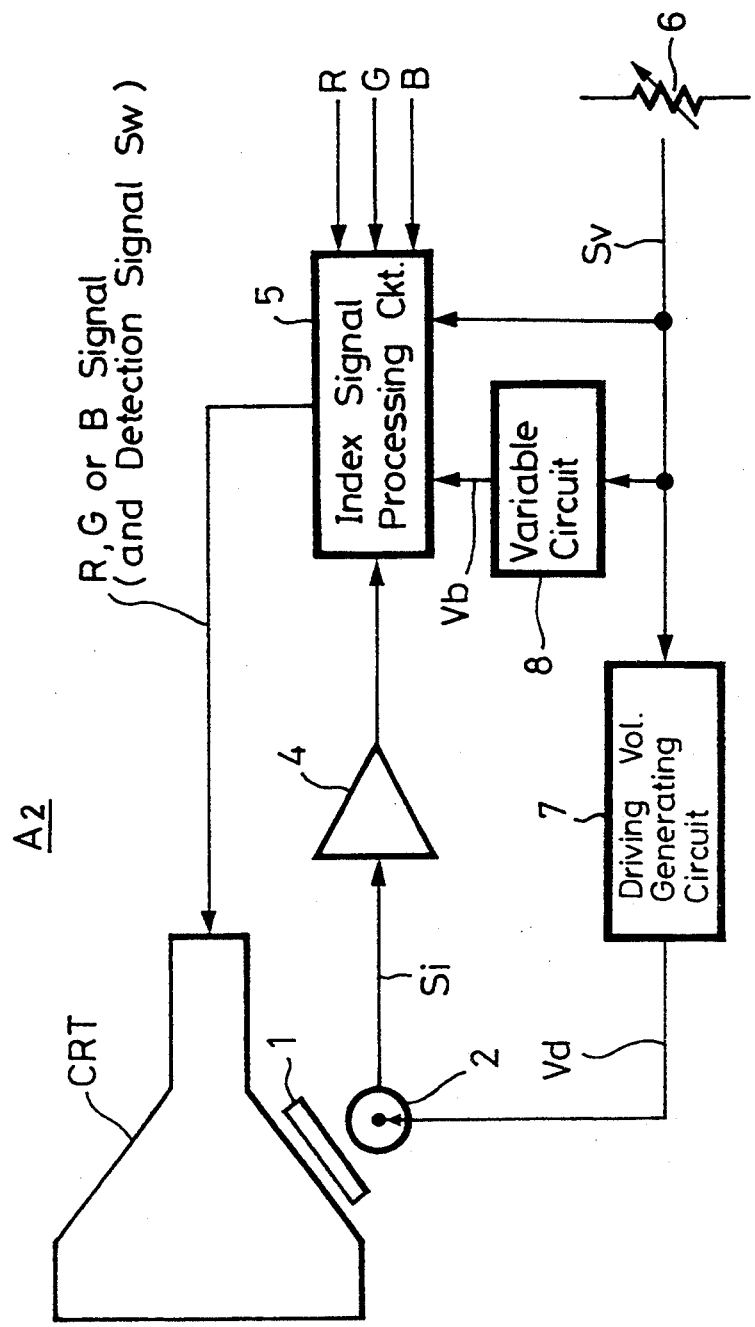
FIG. 5 is a schematic diagram illustrating an arrangement of a display device according to a second embodiment of the present invention.

A display device A2 according to a second embodiment of the present invention will hereinafter be described with reference to FIG. 5. In FIG. 5, like parts corresponding to those of FIG. 2 are marked with the same references and therefore need not be described in detail.

As shown in FIG. 5, the display device A2 has substantially the same constructions as that of the display device A1 of the first embodiment but is different from the latter in that a variable circuit 8 is provided for changing in accordance with the luminance level control signal Sv a level of the detection signal Sw which is used to excite and detect the index fluorescent materials I in the ineffective screen area a.

The variable circuit 8 changes a bias voltage Vb on which the detection signal Sw is superimposed to a high level when the luminance level control signal Sv is changed to a high level, for example, while changing the bias voltage Vb to a low level when the luminance level control signal Sv is changed to a low level.

According to the thus constituted display device of the second embodiment, in addition to the driving voltage generating circuit 7 of the first embodiment, since the variable circuit 8 is provided for changing in accordance with the luminance level control signal Sv, a level of the detection signal Sw which is used to excite and detect the index fluorescent materials I in the ineffective screen area a, the black level in a low luminance mode can be decreased and further a normal image can be displayed even in a high luminance mode, thereby the image quality can be improved as well as the first embodiment.

When the luminance level control signal Sv becomes a high level to thereby increase the luminance of the CRT, the multiplication ratio of the photomultiplier 2 decreases in accordance with the driving voltage Vd from the driving voltage generating circuit 7. However, since a signal level of the detection signal Sw becomes higher by the bias voltage Vb from the variable circuit 8, an amount of light generated from the index fluorescent materials I of the ineffective screen area a increases, so that light generated from the index fluorescent material, in particular, the first index fluorescent material I1 on the ineffective screen area a can be surely detected.

In contrast, when the luminance level control signal Sv becomes a low level to thereby decrease the luminance of the CRT, the multiplication ratio of the photomultiplier 2 increases in accordance with the driving voltage Vd from the driving voltage generating circuit 7, so that an amount of light generated from the index fluorescent materials I of the ineffective screen area a is increased by the photomultiplier 2, thereby a signal level of the index signal Si may be saturated. However, since a signal level of the detection signal Sw becomes lower by the bias voltage Vb from the variable circuit 8, an amount of light generated from the index fluorescent materials I of the ineffective screen area a decreases, so that the saturation of the index signal Si is prevented and so light generated from the index fluorescent material, in particular, the first index fluorescent material I1 on the ineffective screen area a can be surely detected.

As described above, in accordance with the display device A2 of the second embodiment, since light generated from the first index fluorescent material I1 can be surely detected, there occurs no phenomenon that the change-over timing of chrominance signals (the R, G, and B signals) is shifted from the correct timing, so that a normal image can be displayed and the image quality can be improved.

While, in the above-described first and second embodiments, the photomultiplier 2 is employed as a sensor for detecting the light generated from the index fluorescent materials I, an element having a multiplication function such as an avalanche diode or the like may be employed in place of the photomultiplier.

Further, while in the above-described embodiments, the multiplication ratio of the photomultiplier 2 is controlled based on the luminance level control signal Sv from the volume 6, it may be controlled by a luminance level signal from another sensor (photomultiplier or the like) for detecting a luminance level of the CRT.

As set out above, according to the thus constituted display device of the present invention, the black level of the beam index type CRT in a low luminance mode thereof can be decreased, and further the saturation of the index signal level in a high luminance mode thereof can be prevented, so that a normal image can be displayed always.

Further, since the index signal based on the first index fluorescent material can be surely detected, a normal image can be displayed.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A display device comprising:
a beam index type cathode ray tube having a fluorescent screen on which red, green and blue fluorescent materials are formed in strip configurations and on which index fluorescent materials are formed in strip configurations with a predetermined pitch;
a photomultiplier receiving a driving voltage for converting light generated from the index fluorescent materials into an electric signal in accordance with a multiplication ratio when an electron beam of the cathode ray tube horizontally scans the fluorescent screen and the electron beam impinges on the index fluorescent material, and for producing an output signal having a level responsive to said driving voltage;
an index signal processing circuit for switching red, green and blue signals in accordance with said output signal from said photomultiplier, and for controlling luminance of said cathode ray tube in accordance with a luminance level control signal fed thereto; and
a driving voltage generating circuit for controlling said driving voltage applied to said photomultiplier in an inverse relationship relative to said luminance level control signal to thereby control said multiplication ratio of said photomultiplier.

2. A display device comprising:
a beam index type cathode ray tube having a fluorescent screen with an effective screen area and an ineffective screen area, with red, green and blue fluorescent materials formed in strip configurations on the effective screen area and with index fluorescent materials formed in strip configurations with a predetermined pitch on both the effective screen area and the ineffective screen area;
a photomultiplier receiving a driving voltage for converting light generated from the index fluorescent materials into an electric signal in accordance with a multiplication ratio when an electron beam of the cathode ray tube horizontally scans the fluorescent materials and the electron beam impinges on the index fluorescent materials, and for producing an output signal having a level responsive to said driving voltage;
an index signal processing circuit for switching red, green and blue signals in with said output signal from said photomultiplier, for adding to one of said red, green and blue signals a detection signal for detecting the index fluorescent materials in the ineffective screen area of said cathode ray tube, and for controlling luminance of said cathode ray tube in accordance with a luminance level control signal fed thereto;
a driving voltage generating circuit for controlling a driving voltage applied to said photomultiplier in an inverse relationship relative to said luminance level control signal to thereby control said multiplication ratio of said photomultiplier; and
a variable circuit for changing a level of said detection signal in accordance with said luminance level control signal also fed thereto.

3. A display device according to claim 2, wherein said variable circuit changes said detection signal to a high level when said luminance level control signal is changed to a high level, and changes said detection signal to a low level when said luminance level control signal is changed to a low level.

4. A display device according to claim 1, 2 or 3, wherein said driving voltage generating circuit controls said driving voltage so as to decrease the multiplication ratio of said photomultiplier when said luminance level control signal is changed to a high level, and said driving voltage generating circuit controls said driving voltage so as to increase the multiplication ratio of said photomultiplier when said luminance level control signal is changed to a low level.

5. A display device according to claim 1, 2, or 3 wherein a ratio of an arrangement pitch of said index fluorescent materials and an arrangement pitch of sets of the red, green and blue fluorescent materials is other than an integer.

* * * * *